Nov. 4, 1930.  J. H. DAVIS  1,780,580
IMPELLING DEVICE
Original Filed June 21, 1928
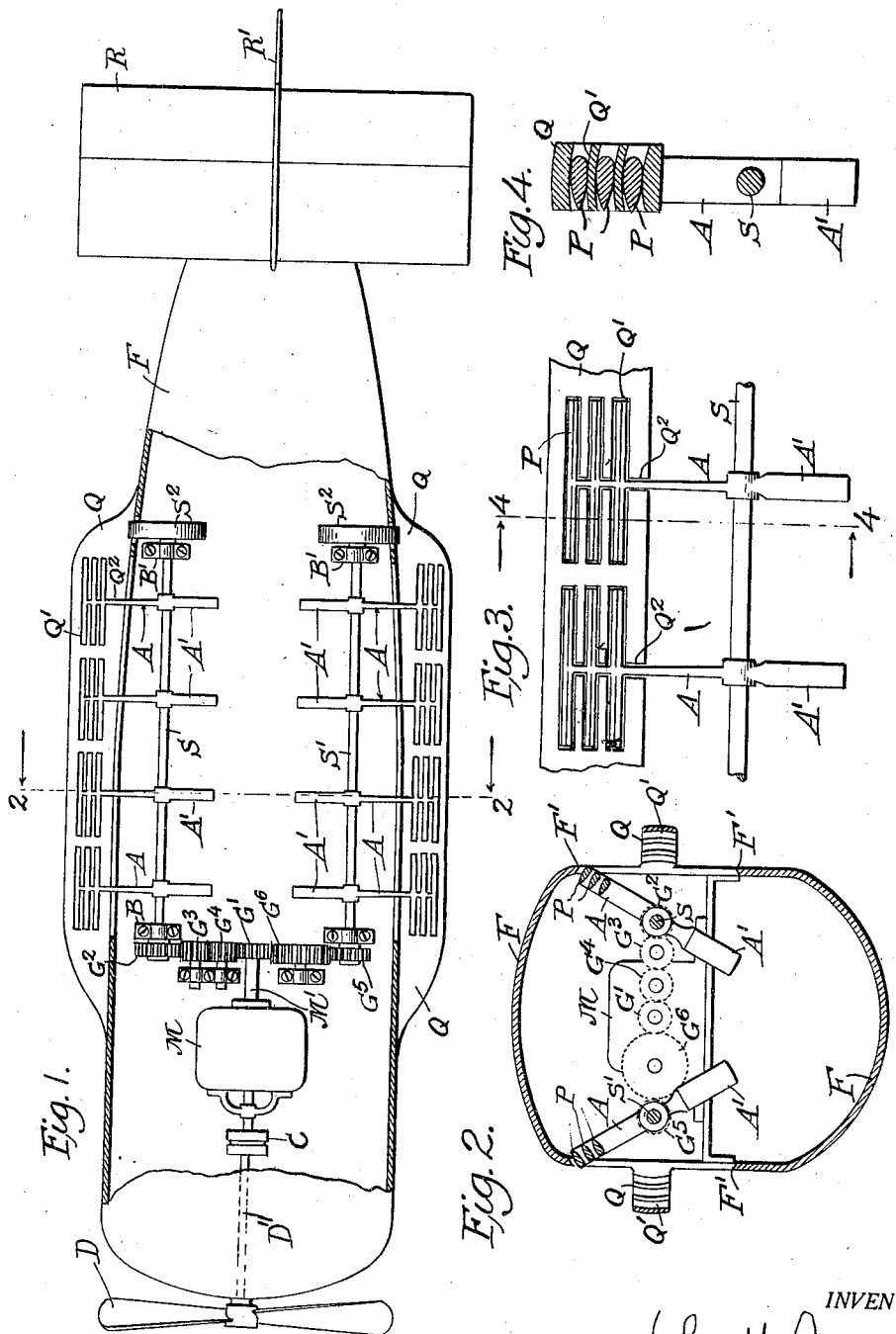
INVENTOR.
BY John H. Davis
Alexander Powell
ATTORNEYS Patented Nov. 4, 1930

1,780,580

UNITED STATES PATENT OFFICE

JOHN H. DAVIS, OF NEW YORK, N. Y., ASSIGNOR TO AIR LINE TRANSPORTATION COMPANY, OF PHILADELPHIA, PENNSYLVANIA, A CORPORATION OF DELAWARE

IMPELLING DEVICE

Application filed June 21, 1928, Serial No. 287,126. Renewed March 21, 1930.

This invention relates to aeronautics, and is especially designed for use in heavier-than-air crafts. The principal object of the invention is to dispense with the usual airplane wings and to enable a heavier-than-air craft to lift itself vertically particularly in starting, and to arrest "dropping" in landing, and to enable it to sustain itself in flight, and also to "hover" over a landing place or other object.

Another object of the invention is to provide an attachment for airplanes which will enable the airplane when starting to lift itself so as to free it from the earth and readily clear obstructions which otherwise it would not be able to clear because of the load it carries, or lack of space to "take-off" in starting. Another object is to enable the airplane to hover over an object or location if desired, and to arrest its descent as it nears the ground, thereby preventing damage to the plane, which would occur if dropping too rapidly when landing. A further object is to enable the operator to use such lifting means to prevent side slip of the plane, and to keep the plane on an even keel, in event a wing should break or should be subjected to unequal pressure tending to turn the airplane over.

A further object of the invention is to provide a plurality of air displacing attachments which can be operated from the motor independently of the propeller, or in connection with the propeller, as desired, and in the present preferred form of the invention these displacers force air downwardly to cause the craft to rise vertically; and also create a suction which tends to lift the craft upwardly.

In the present preferred form of the invention one or more of these air displacers may be arranged at each side of the fuselage, and one or more thereof may be arranged within the fuselage.

I will explain the invention with reference to the accompanying drawing which diagrammatically illustrates one embodiment thereof as applied to a heavier-than-air craft, to enable others skilled in the art to adopt and use the same. The essentials of the invention and the novel combinations of parts and novel features of construction for which protection is desired, are summarized in the claims.

In said drawing:—

Figure 1 is a diagrammatical plan view, partly broken away, showing the air craft fuselage equipped with one embodiment of my invention.

Fig. 2 is a transverse section on the line 2—2, Fig. 1.

Fig. 3 is an enlarged plan showing two adjacent impellers and their cylinders.

Fig. 4 is a transverse section on the line 4—4, Fig. 3.

In the drawing F represents the fuselage of the air craft which need not be, but may be, provided with wings, no wings being shown in the drawing, my impelling device taking the place of the usual airplane wings for obtaining and sustaining lift. At the forward end of the fuselage F is a propeller D by which the craft is drawn through the air, the propeller D being mounted on a shaft D' operated by a motor or engine M, of any desired type, through a clutch conventionally shown at C, whereby the propeller may be caused to idle while the motor M is still running. At the end of motor M opposite from clutch C is a shaft M' having a gear G' thereon which drives through intermediate gears two shafts S and S' arranged at opposite sides of the fuselage F above the center of gravity thereof, said shafts extending substantially the full length of the body of the fuselage from motor M to the rear portion adjacent the elevator R and rudder R'. Shafts S and S' are mounted in suitable bearings B and B' secured to the inner sides of the fuselage F and are driven at the same speed in opposite directions as hereinafter described.

Shaft S is provided with a gear $G^2$, opposite the gear G' on shaft M', two intermediate gears $G^3$ and $G^4$ being interposed between the gears G' and $G^2$ whereby shaft S is driven in a direction opposite to that of shaft M'. Shaft S' is provided with a gear $G^5$ opposite the gear G' and of same size as gear $G^2$, an idler gear $G^6$ being interposed between the gear G' and $G^5$ whereby shaft S' is driven at the same speed as shaft S but in a direction opposite that of shaft S by reason of the fact that only one idler gear is interposed between the gear G' and gear G⁵. Each shaft S and S' is provided with a relatively small fly wheel S².

Spaced along each shaft S and S' are fixed radially disposed arms A of sufficient length to extend through openings F' outside the body of the fuselage F a short distance as the arms are rotated; and at the outer end of each arm A is arranged a series of pistons P hereinafter described. The opposite ends of the arms A are preferably provided with counterweights A' for counterbalancing the weight of the arms and their pistons. Preferably the arms on each shaft S and S' are arranged opposite each other in order to properly balance the same.

Pistons P preferably comprise a series of spaced cross arms evenly spaced on each arm from the outer end of the arm and adapted as the arms are rotated to extend through openings F' beyond the side of the fuselage F. Preferably each cross arm is of stream line cross-section as shown in Fig. 4, the over-all thickness of the cross-arm being substantially about ⅙ of the width and the forward edge of the cross-arm in the direction of rotation being blunt, the rear edge tapering to a point whereby as the cross-arms or pistons P pass through the cylinders Q' (hereinafter described) a maximum downward pressure or lift will be exerted and after the pistons P have passed through the cylinders Q' a minimum reaction in an upward direction will be exerted, due to the stream-line cross-section of the pistons.

At each side of the fuselage F is a cylinder block Q in the form of a fin of suitable thickness. The forward and rear ends of the cylinder block Q are stream-lined and the block is substantially rectangular in cross-section. In the cylinder block Q opposite each arm A is formed a series of spaced arcuate cylinders Q' substantially rectangular in cross section and adapted to closely receive the pistons P as the arms rotate, the pistons entering the upper end of the cylinders and passing downwardly therethrough as the arms rotate. Openings Q² are also provided in the block whereby the arms A may readily pass therethrough as shown in Fig. 2, such openings being made as small as possible so as to provide a maximum impelling force due to sudden checking of air flow around the pistons as the pistons pass through the cylinders. While the stream-line pistons P are passing through the cylinders Q' both pressure below and suction above is created; but after the pistons leave the cylinders the same while travelling the rest of their orbit offer a minimum resistance to the air. By rotating the pistons P at high peripheral speed, a great lifting effect is actually obtained.

As above stated, my novel impelling device comprising the rotary pistons and the arcuate cylinders may take the place of the usual airplane wings and will permit the craft to rise vertically, or to hover about a desired point, or to descend quickly or slowly, and the propeller D may be clutched to or declutched from the motor whereby both propeller D and the impellers P may be driven separately or simultaneously and thereby impart any horizontal or vertical motion desired to the craft.

The motor may be of any desired type, and may comprise a motor-generator unit, and in place of the fly wheels S² on the shafts S and S' I may provide electric motors the armatures of which may take the place of the fly wheels, and the individual motors for each shaft S or S' may then receive power from the main motor-generator unit. Any desired hook up for the arms A may be provided and any number of shafts may be provided carrying any number of such arms whereby all such arms may be driven simultaneously or certain units cut out, but it would be preferable to have the units on one side of the fuselage normally balance those on the other.

My novel impelling device may be used not only for obtaining a vertical lift but for driving an airplane or other air craft forward or in any other desired direction, and I do not consider my invention limited to the specific form shown in the drawing nor confine its use to air craft only. Obviously changes may be made in the device within the scope of the claims.

I claim:—

1. An impelling device, comprising a piston adapted to travel in an orbital path, and a cylinder in the path of said piston conforming in area therewith and adapted to check the air flow around the piston when passing therethrough causing a maximum resistance.

2. In a device as set forth in claim 1; said piston being of stream-line cross-section whereby a minimum resistance to the air is set up except when passing through the cylinder.

3. An impelling device comprising a piston; means for moving the piston in an orbital path; and a cylinder in the path of said piston conforming in area therewith and adapted to check the air flow around the piston when passing therethrough causing a maximum resistance.

4. In a device as set forth in claim 3; said piston being of stream-line cross-section whereby a minimum resistance to the air is set up except when passing through the cylinder.

5. An impelling device for air craft comprising opposed sets of pistons at each side of the craft adapted to travel synchronously in an orbital path, and cylinders at the sides of the craft in the path of each piston conforming in area therewith and adapted to check the air flow around the piston when passing therethrough causing a maximum resistance.

6. In a device as set forth in claim 5; each piston being of stream-line cross-section whereby a minimum resistance to the air is set up except when passing through the cylinder.

7. An impelling device for air craft comprising opposed sets of pistons arranged at each side of the craft; means for driving the pistons in an orbital path; said pistons travelling synchronously in opposite direction and cylinders at the sides of the craft in the path of each piston adapted to check the air flow around the piston when passing therethrough causing maximum air resistance.

8. In a device as set forth in claim 7, each piston being of stream-line cross-section whereby a minimum resistance to the air is set up except when passing through the cylinder.

9. A lifting device for bodies comprising opposed shafts at each side of the body; means for rotating the shafts in opposite directions; series of opposed arms on said shafts; pistons on said arms; and cylinders at each side of the body in the path of the pistons adapted to check the air flow around the pistons when passing therethrough causing a maximum air resistance.

10. In a device as set forth in claim 9; each piston being of stream-line cross-section whereby a minimum resistance to the air is set up except when passing through the cylinder.

11. A lifting device for air craft, comprising opposed horizontal shafts at each side of the craft; means for rotating the shafts at each side at the same speed but in opposite directions; series of opposed arms on said shafts; pistons on said arms, and cylinders at each side of the craft, in the path of the pistons adapted to check the air flow around the pistons when passing therethrough causing a maximum air resistance.

12. In a device as set forth in claim 11, each piston being of stream-line cross-section whereby a minimum resistance to the air is set up except when passing through the cylinder.

13. A lifting device for air craft comprising opposed horizontal shafts at each side of the craft; means for rotating the shafts at each side at the same speed but in opposite directions; series of opposed arms on said shafts; a series of spaced pistons adjacent the outer end of each arm and cylinders at each side of the craft in the path of said pistons adapted to check the air flow around the pistons when passing therethrough causing a maximum air resistance.

14. In a device as set forth in claim 13; each piston being of stream-line cross-section whereby a minimum resistance to the air is set up except when passing through the cylinder.

JOHN H. DAVIS.